(12) United States Patent
Zhou et al.

(10) Patent No.: US 8,798,126 B2
(45) Date of Patent: Aug. 5, 2014

(54) RECEIVER CALIBRATION USING OFFSET-DATA ERROR RATES

(75) Inventors: Dacheng Zhou, Fort Collins, CO (US); Daniel Alan Berkram, Loveland, CO (US); Peter David Maroni, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/285,526

(22) Filed: Oct. 31, 2011

(65) Prior Publication Data

US 2013/0107934 A1 May 2, 2013

(51) Int. Cl.
*H03H 7/30* (2006.01)
*H04L 25/03* (2006.01)

(52) U.S. Cl.
CPC .............................. *H04L 25/03885* (2013.01)
USPC .......................................... 375/229; 375/316

(58) Field of Classification Search
CPC ............... H04I 25/03343; H04I 25/03885; H04I 25/03057; H04I 25/03146; H04I 2025/03636; H04I 2025/03356; H04I 2025/03245; H04I 2025/03681
USPC ........... 375/29–233, 294, 316, 346, 348, 350, 375/359, 371
See application file for complete search history.

(56) References Cited

U.S. PATENT DOCUMENTS

| | | | |
|---|---|---|---|
| 6,804,695 B1 * | 10/2004 | Hsu | 708/322 |
| 7,190,742 B2 | 3/2007 | Popescu et al. | |
| 7,277,480 B2 | 10/2007 | Gorecki | |
| 7,499,489 B1 | 3/2009 | Ellersick et al. | |
| 7,551,909 B1 * | 6/2009 | Moon et al. | 455/260 |
| 7,586,987 B2 | 9/2009 | Vorenkamp et al. | |
| 7,697,649 B2 * | 4/2010 | Okamura | 375/355 |
| 8,050,317 B2 * | 11/2011 | Okamura et al. | 375/229 |
| 8,243,782 B2 * | 8/2012 | Mobin et al. | 375/232 |
| 8,300,684 B2 * | 10/2012 | Mobin et al. | 375/350 |
| 2004/0156432 A1 * | 8/2004 | Hidaka | 375/233 |
| 2005/0259726 A1 * | 11/2005 | Farjad-rad | 375/232 |
| 2005/0271137 A1 * | 12/2005 | Kolze et al. | 375/233 |
| 2007/0047680 A1 * | 3/2007 | Okamura | 375/348 |
| 2008/0069191 A1 | 3/2008 | Dong et al. | |
| 2009/0161747 A1 * | 6/2009 | Aziz et al. | 375/231 |
| 2010/0238993 A1 * | 9/2010 | Huang et al. | 375/233 |
| 2010/0329325 A1 * | 12/2010 | Mobin et al. | 375/232 |
| 2011/0222594 A1 * | 9/2011 | Zerbe et al. | 375/233 |
| 2012/0044984 A1 * | 2/2012 | Zerbe et al. | 375/233 |
| 2012/0128055 A1 * | 5/2012 | Jiang | 375/233 |
| 2012/0192043 A1 * | 7/2012 | Jiang et al. | 714/799 |
| 2012/0201289 A1 * | 8/2012 | Abdalla et al. | 375/233 |
| 2012/0207196 A1 * | 8/2012 | Zerbe et al. | 375/219 |

\* cited by examiner

*Primary Examiner* — Emmanuel Bayard

(57) ABSTRACT

During a calibration process, a data input signal is sampled using each of plural receiver equalization setting. For each of the receiver equalization settings, a respective offset-data error-rate is measured. Based on the offset-data error-rate measurements, an equalizer setting is selected for use during normal non-calibration operation of the receiver.

15 Claims, 4 Drawing Sheets

RECEIVER CALIBRATION USING OFFSET-DATA ERROR RATES

BACKGROUND

When integrated circuits communicate with each other via printed-circuit boards at high data rates, the signals may suffer channel-induced distortion including frequency-dependent attenuation. Where the signals represent a sequence of data symbols, e.g., logic-high values and logic-low values, encoded as voltage levels, the distortion can smear symbol representations so that they overlap, resulting in inter-symbol interference (ISI).

Channel-induced distortion can be addressed using transmitter pre-emphasis and receiver equalization. Transmitter pre-emphasis typically involves selecting settings for a "finite impulse response" (FIR) filter, while receiver equalization involves selecting settings for an analog high-pass filter. Various transmitter pre-emphasis and receiver equalization settings can be evaluated by measuring a bit-error rate (BER) for the receiver output data. For example, receiver initialization can involve sweeping equalizer settings, inputting a training pattern at each equalizer setting, measuring a receiver-data BER by comparing the receiver output data with the training pattern, and selecting a setting with a minimum BER for the receiver output data.

BRIEF DESCRIPTION OF THE DRAWINGS

The following figures represent examples and not the invention itself.

DETAILED DESCRIPTION

Figure 1:
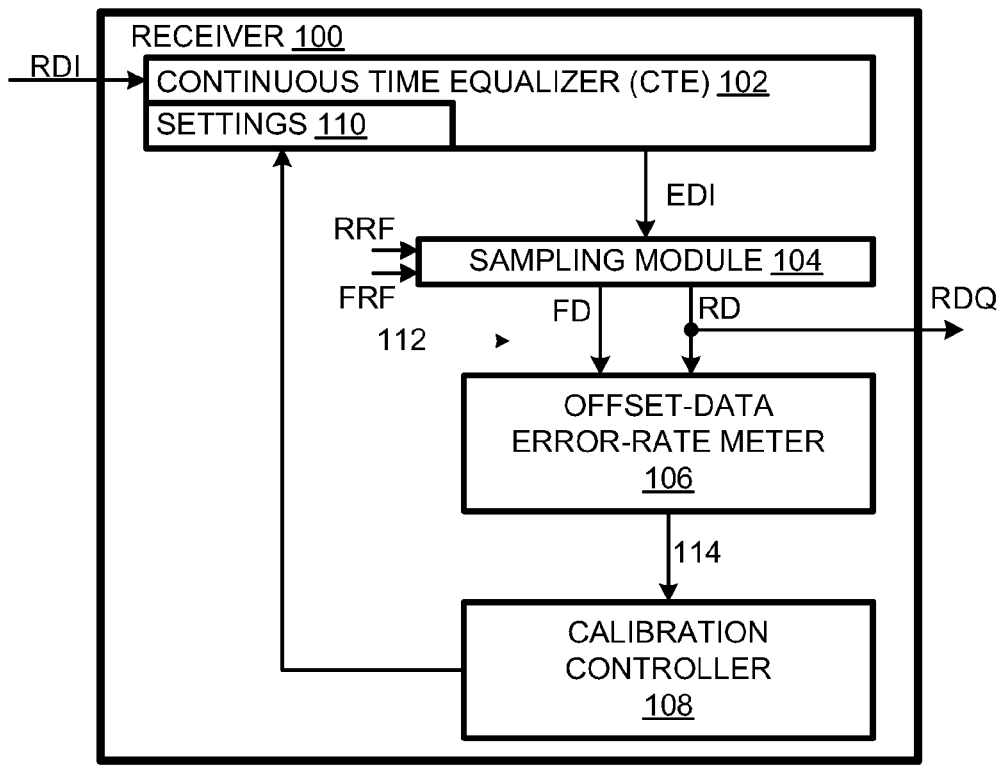
FIG. 1 is a schematic diagram of a receiver in accordance with an example.

A receiver 100 calibrates its continuous-time equalizer (CTE) using an offset-data error rate. Basing calibration on an offset-data rate instead of or in addition to a receiver output data error rate: 1) allows calibration to be protocol agnostic; and 2) provides for finer tuning of the CTE. These advantages are explained further below in the context of the following examples.

Receiver 100 receives a receiver data input signal RDI and outputs a receiver data-symbol output sequence RDQ. Receiver 100 includes a CTE 102, a sampling module 104, an offset-data error-rate meter 106, and a calibration controller 108. CTE 102 receives and equalizes receiver data input signal RDI to yield an equalized data input signal EDI. CTE 102 can assume various compensation settings 110, e.g., that boost high frequency signal components relative to low frequency signal components to varying degrees to compensate for the low-pass characteristics of a communications channel.

Sampling module 104 samples equalized data input signal EDI to yield data-symbol sequences 112 including receiver data-symbol sequences RD and offset data-symbol sequences FD. Receiver data-symbol sequences RD include a receiver data-symbol output sequence RDQ. Depending on the example, receiver data-symbol output sequence RDQ may be obtained by multiplexing (merging) other receiver data-symbol sequences. To generate receiver data-symbol sequences RD, sampling module 104 uses time-varying "receiver" reference levels RRF.

To generate offset data-symbol sequences FD, sampling module 104 uses time-varying "offset" reference levels FRF that track receiver reference levels RRF at a substantially fixed offset; in this context, "substantially" means that the correlation between an offset reference level FRF and a respective receiver reference level RRF is above 80%.

Offset-data error-rate meter 106 measures error rates based at least in part of offset data-symbol sequences FD. In some but not all examples, receiver data-symbol sequences RD may also be used in measuring offset data error rates. Offset-data error-rate meter 106 provides offset-data error-rate measurements 114 to calibration controller 108.

Calibration controller 108 selects various settings 110 for CTE 102. For each setting, calibration controller 108 receives, from offset-data error-rate meter 106, offset-data error rate measurements 114. Based on the error rates for the different settings, calibration controller 108 selects one of settings 110 for use during normal (non-calibration) operation.

Figure 2:
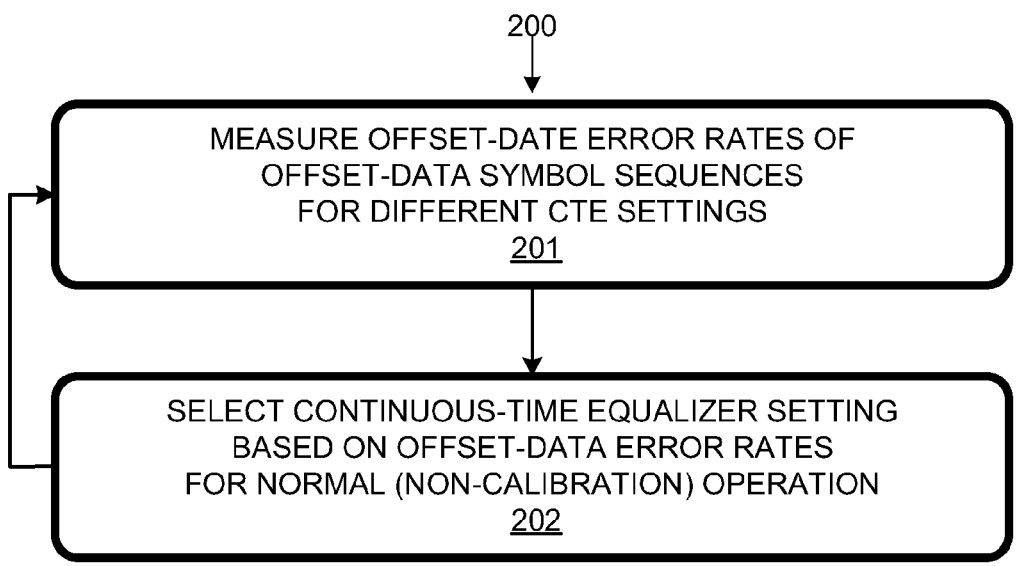
FIG. 2 is a flow chart of a calibration process implementable by the receiver of FIG. 1 in accordance with an example.

Receiver 100 implements a process 200, flow-charted in FIG. 2. At 201, offset-data error rates are measured for different CTE settings. At 202, a CTE setting is selected for normal (non-calibration) operation of receiver 100 based on the offset-data error rate measurements.

Generally, extracting valid data involves sampling an equalized data input signal at a suitable phase and using a suitable reference level. The range of reference levels, e.g., voltage levels, that can be used to extract valid data is typically maximal midway through a data-symbol period. The range tapers off away from mid-period and disappears nearer the data-symbol transitions. For example, in a plot of voltage versus phase, the points corresponding to combinations of phase and voltage level that can be used to extract valid data is referred to and is shaped somewhat like an "eye".

In principle, as long as the sampling time and reference level corresponds to a position within the eye, valid data will be extracted. However, the nearer the sampling is to an eye boundary, the more likely a small perturbation in some parameter will cause a data error. Maintaining sampling parameters near the eye center reduces the likelihood of a data error.

Offset data-symbol sequences can be generated for use in centering sampling parameters used to generate receiver data-symbol sequences. For example, high and low offset reference levels at fixed voltage offsets above and below, respectively, a receiver reference level used to generate a receiver data-symbol sequence can be used to "bracket" the receiver reference level. As the receiver reference level deviates from the eye center, one of the bracketing offset reference levels will move toward an eye boundary. If the receiver reference level deviates too far from the eye center, one of the offset reference levels will leave the eye; as a result, the corresponding offset data-symbol sequence will include erroneously decided data symbols.

Tuning a CTE adjusts an eye's size. Tuning a CTE using offset data-symbol sequences distinguishes CTE settings that accommodate not only a receiver reference level but also offset reference levels. Such distinctions are difficult to make using only receiver data-symbol sequences. Accordingly, using offset-data rates for calibration provides for more assured selection of a setting that achieves the "biggest eye" as opposed to a "big-enough" eye. Note that an eye that is "big-enough" during training, may not be big enough as conditions vary in normal use. The finer tuning available using offset data error rates can result in more reliable data over time.

Receiver-data error rates are typically measured using a training pattern of known data values with which receiver data-symbol values can be compared. If a data symbol fails to match the corresponding value in the training sequence, an error is indicated. Offset-data error rates can be determined without knowing the actual input data. Since, under ideal conditions, offset-data symbol sequences equal a respective data-symbol sequence and therefore each other, offset-data errors can be detected by comparing high and low offset-data symbol sequences.

Accordingly, offset-data error rates can be obtained without using a training sequence; also, offset data error rates can be obtained using a training sequence but not knowing what the training sequence is. Different communications protocols can employ different training sequences; receiver 100 is compatible with different protocols because it is agnostic with respect to training sequences—i.e., it does not depend on their content.

Figure 3:
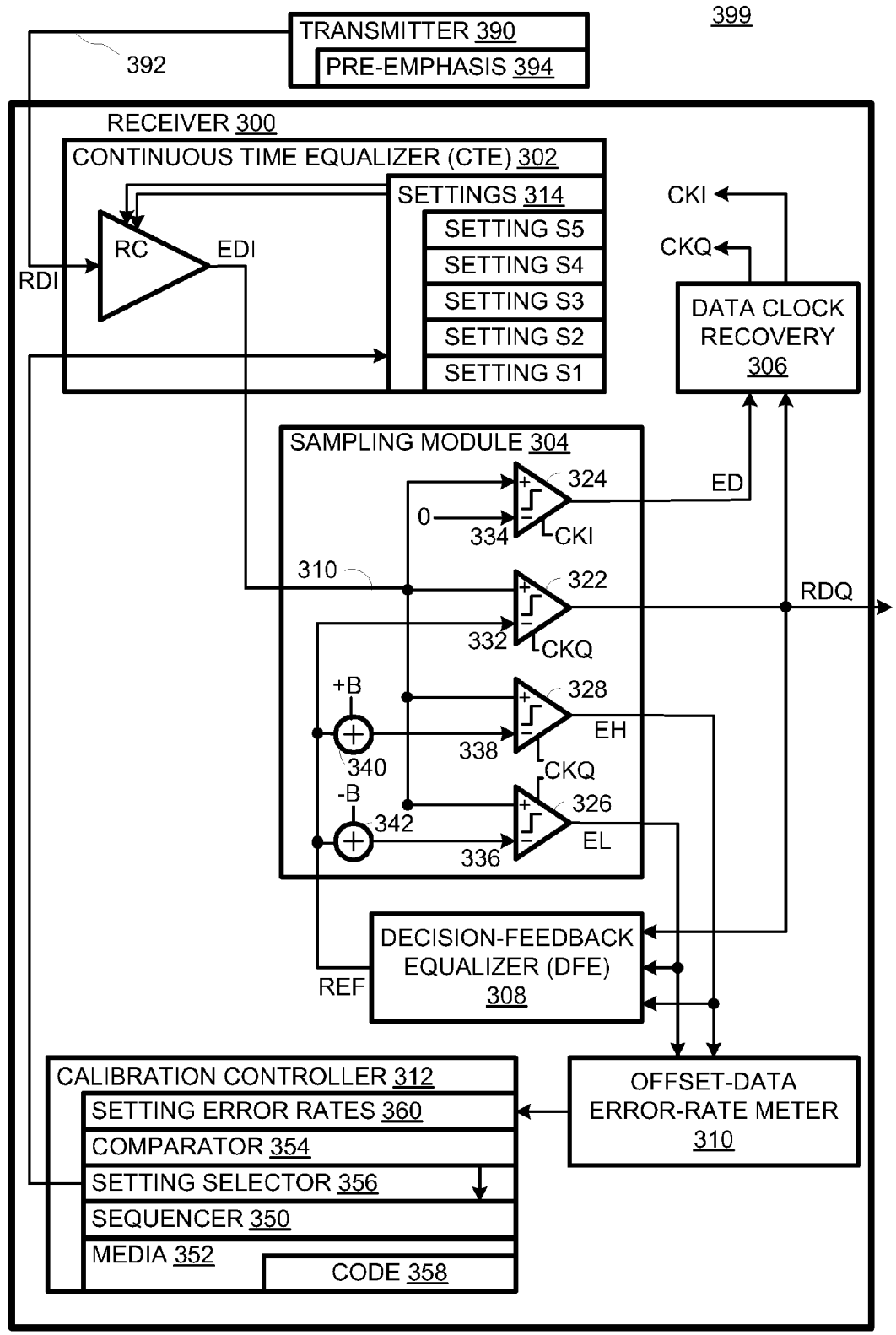
FIG. 3 is a schematic diagram of a communications system in accordance with an example.

The advantages of using offset-data error rates in receiver calibration can be further understood with respect to a communications system 399, shown in FIG. 3. Communications system 399 includes a transmitter 390, a communications channel 392, and a receiver 300. Receiver 300 receives a received data input signal RDI via channel 392 from transmitter 390. Receiver 300 outputs a receiver data-symbol sequence RDQ. Receiver 300 includes a continuous-time equalizer (CTE) 302, a sampling module 304, a data clock recover circuit (DCRC) 306, a decision feedback equalizer (DFE) 308, an offset-data error-rate meter 310, and a calibration controller 312. Note that all these receiver components include programmable or non-programmable hardware.

CTE 302, which can be a continuous-time linear equalizer (CTLE), applies different gains to different frequency ranges within a received data input signal RDI to yield equalized data input signal EDI. CTE 302 has settings 314, including settings S1-S5, that provide for different degrees of compensation for channel distortion. Other examples may have few, more, or many more CTE settings available.

Figure 4:
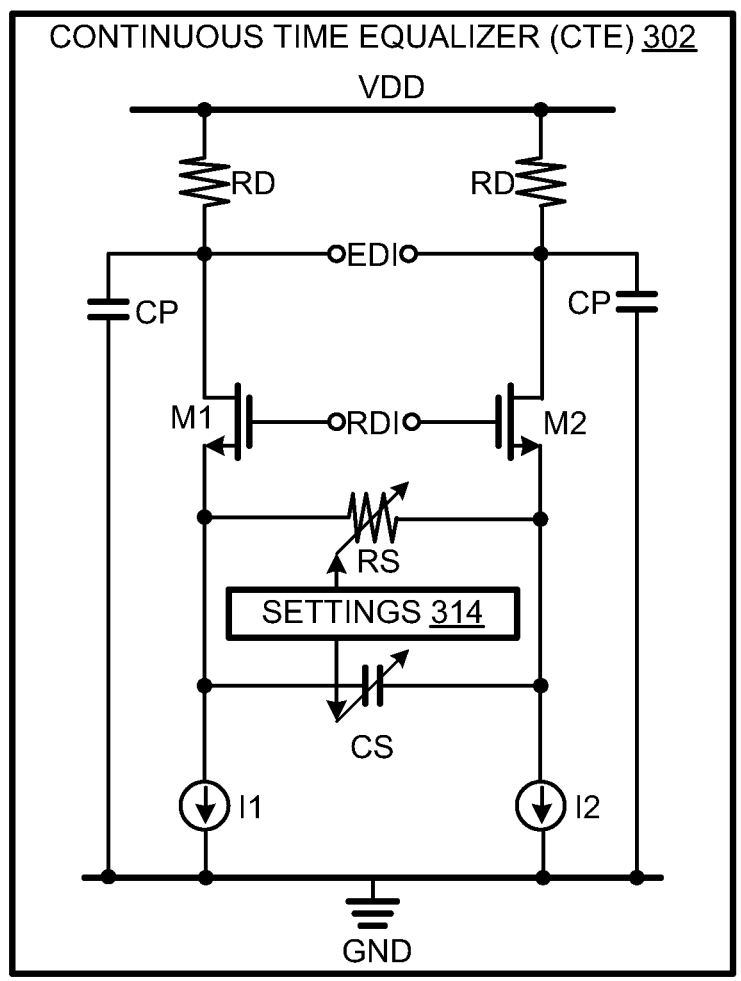
FIG. 4 is a circuit diagram of a continuous-time equalizer of the communications system of FIG. 3.

The basic circuit design for CTE 302 is shown in FIG. 4. As represented in FIG. 4, CTE 302 includes a voltage rail VDD, resistors RD and RS, capacitors CP and CS, current sources I1 and I2, transistors M1 and M2, and ground GND, arranged as shown. Note that CTE input RDI and CTE output EDI are shown in FIG. 4. Also, resistor RS and capacitor CS are variable and controllable by settings 314, each of which specifies a specific value for RS and a specific value for CS. In some examples, values for other parameters of a CTE are controlled by settings.

Sampling module 304 (FIG. 3) is coupled to CTE 302 for receiving equalized data input signal EDI. Sampling module 304 includes samplers 322, 324, 326, and 328. Sampler 322 generates receiver data-symbol sequence RDQ, which serves as the output of receiver 300. To this end, reference input 332 of sampler 322 samples relative to a time-varying reference level REF provided by DFE 308. The timing of sampler 322 is controlled by a quadrature phase data-rate clock CKQ.

Sampler 324 samples equalized data input signal EDI to generate an edge detection signal ED. In view of the differential nature of equalized data input signal EDI, sampler 324 uses a nominally zero voltage reference level 334. The timing of sampler 324 is controlled by an in-phase data rate clock CKI.

Data clock recovery circuit DCRC 306 uses edge detection signal ED and receiver data-symbol sequence RDQ to determine the timing for equalized data input signal EDI. DCRC 306 outputs in-phase clock CKI, which is aligned with the phases of the edge detections indicated in edge detection signal ED. DCRC 306 also outputs quadrature clock CKQ 180° out-of-phase with respect to CKI so that it is centered within a symbol period.

Samplers 326 and 328 are driven by quadrature clock CKQ so that they are in phase with sampler 322. Respective reference level inputs 336 and 338 are controlled by reference level REF. However, a summer 340 offsets reference level REF by a bias amount B, with the sum being input to reference input 338 of sampler 328. Likewise, a summer 342 offsets reference level REF by −B and provides the resulting level to reference input 336 of sampler 326. Thus, samplers 326 and 328 output respective low and high offset data-symbol sequences in phase with receive data-symbol sequence RDQ.

Decision feedback equalizer (DFE) 308 generates reference level REF based on recent data-symbol values from receiver data-symbol sequence RDQ. The effect of each data symbol is determined by a respective tap coefficient; the tap coefficients vary at most slowly relative to the data rate. DFE 308 uses offset data-symbol sequences to help determine how to adjust the tap coefficients to maintain reference level REF well within the eye for equalized data input signal EDI.

Offset-data error-rate meter 310 generates error-rate measurements at least in part by comparing sequences EL and EH on a symbol-by-symbol basis. For example sequences EL and EH can be XORed to detect inconsistencies in their symbol sequences. In an alternative embodiment, a receiver data-symbol sequence and a reference data-symbol sequence are compared to yield offset-data error-rate measurements. Meter 310 counts the number of errors detected in a symbol sequence segment for a fixed duration (so that different measurements can be compared). The duration is selected to be long enough to include all available ISI information. For example, if channel distortion is such that one symbol can affect the next 15 symbols in equalizer data input signal EDI, then the duration used by meter 310 can be 16 or more symbol periods long.

Calibration controller 312 includes a sequencer 350, media 352, a comparator 354, and a setting selector 356. Setting selector 356 selects among CTE settings 314. During calibration, these selections are determined by sequencer 350 as described further below. Non-transitory controller-readable media 352 is encoded with code 358. Code 358 can represent offset-data error rates 354 for at least two of CTE setting 314, as provided by meter 310. Comparator 354 provides for identifying a lower or lowest offset-data error rate, enabling calibration controller 312 to select a setting with the lowest offset-data error rate for use during normal (non-calibration) operation.

Code 358 is further configured to, when executed by controller 312, implement at least portions of a calibration process 500. At 501, transmitter pre-emphasis is set low: more specifically, a transmitter attempting to communicate with receiver 300 over a channel sets its pre-emphasis to zero or to some level below a level expected to best compensate for channel distortion. At 502, receiver compensation is set high, e.g., at setting S5; more specifically, a maximum CTE setting or at least a setting above that expected to best compensate for channel distortion is selected. Since some steps are to be repeated, an iteration index N can be set equal to 1, at least for expository purposes, to keep track of iterations.

At 503, the transmitter transmits data to receiver 300. This data can be a protocol-dependent training sequence. However, since receiver 300 calibrates based on offset-data errors and does not rely on predetermined symbol values, receiver 300 does not have to determine what that protocol or training sequence is. At 504, receiver 300 sets the sampling edge, e.g., transitions of clock CKQ, to the center of the data eye. At 505, offset-data errors are detected and accumulated to determine an offset data rate for the first CTE setting, e.g., S5.

At 506, receiver compensation is decremented. In receiver 300, sequencer 350 dictates an order of settings from maximum compensation through progressively lower compensation. In the first iteration of 506, this decrementing involves selecting setting S4. Subsequent decrements can result successively in settings S3, S2, and S1. Concomitantly, iteration index N is incremented. In the first iteration of 506, N is incremented from 1 (set at 505) to 2. At 507, as the incoming data signal is sampled, offset-data errors are detected and counted for the fixed duration to determine an offset-data error rate for the current setting; in the first iteration of 507, this is the error rate for setting S4.

At 508, the rates for the two most recent setting (SN and SN−1) are compared. If the latter rate (e.g., for setting S4) is lower the former rate (e.g., for setting S1) then process 500 iterates to 506. Otherwise, it stops at 509 and a setting associated with the lower (and therefore lowest so far) error rate is selected for normal operation.

Figure 5:
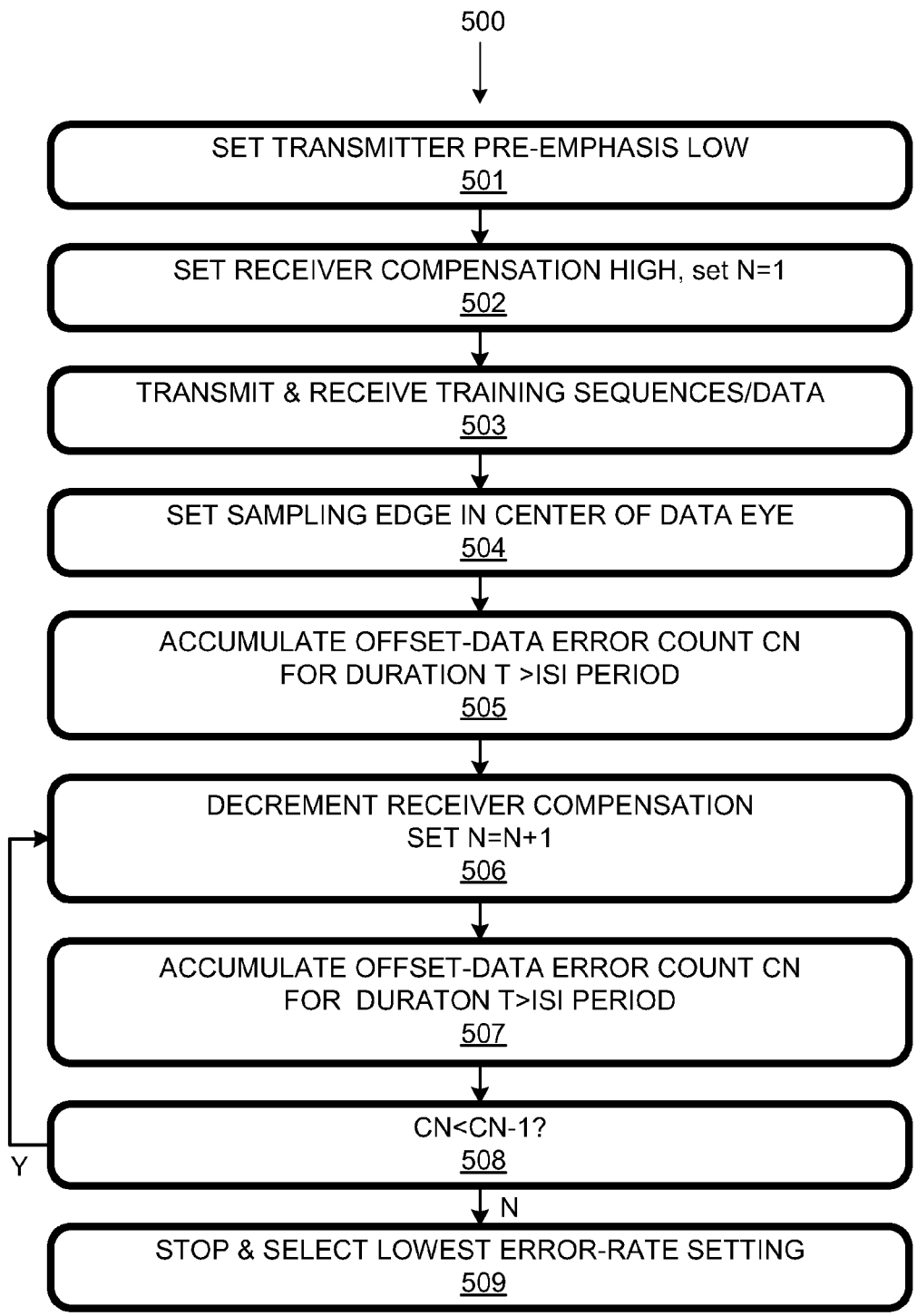
FIG. 5 is a flow chart of a calibration process implementable by the receiver of FIG. 3 in accordance with an example.

In some cases, there may be many compensation settings that yield zero offset-data errors, e.g., at 505 or 507 in FIG. 5. While this bodes well for error-free communications, it is still desirable to select an optimal setting. Accordingly, process 500 can be refined by increasing the sensitive of the calibration procedure when a zero offset-data error count is encountered.

Calibration sensitivity can be increased by making it easier for offset-reference levels to cross an eye boundary, e.g., by lowering currents I1 and I2 (FIG. 4) so as to reduce eye size, or by increasing the offset bias B (FIG. 3), or both until a setting is reached for which yields a non-zero offset-data count. At that point, process 500 can resume, e.g., continue at 506 (if the zero occurred at 505) or 507 (if the zero occurred at 506). After the desired compensation has been found at 509, the maximum gain can be reinstated for normal non-calibration operation.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer a system including non-transitory tangible material in or on which information is or can be encoded so as to be readable by a controller.

Herein, "receiver", when used to qualify a data-symbol sequence, relates to a data-symbol sequence that forms all or part of the receiver output intended to be interpreted as a recovered version of the data encoded in the receiver input. Accordingly, a "receiver reference level" is a reference level used by a sampler to generate a receiver data-symbol sequence. In contrast, an "offset" reference level is a reference level that is offset from a receiver reference level by a fixed or slowly varying amount so that the correlation between levels is at least 90%. Similarly, an "offset data-symbol sequence" is a data-symbol sequence generated using an offset reference level.

Herein, an "offset-data error", is an error in an offset data-symbol sequence that may, for example, be detected by comparing an offset data-symbol sequence with another data-symbol sequence, e.g., either another offset data-symbol sequence or a receiver data-symbol sequence. Herein, an "offset-data error rate" corresponds to a ratio of offset-data errors over time, e.g., as measured in terms of a number of data-symbol periods. A data-symbol period is the time between one data symbol and the next in a data-symbol sequence.

Herein, "compensation" is used relative to the distortion that a signal undergoes as it is transmitted from a transmitter over a channel to a receiver. In the present context, a channel typically acts as a low-pass filter, attenuating high-frequency signal components relative to low-frequency signal components. Accordingly, compensation typically involves boosting high-frequency signal components relative to low-frequency signal components. Such compensation can be implemented using a continuous-time equalizer (CTE), which can also serve as a front-end amplifier.

In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A calibration process comprising:
sampling a data-input signal using first and second samplers that are operated in-phase with respect to each other and using respective first and second reference voltages that are offset from each other so as to yield respective first and second data-symbol sequences;
measuring offset-data error rates for plural equalization settings of a receiver by obtaining offset-data error-rate measurements for respective ones of said equalization settings while sampling said data-input signal, said measuring including comparing said first and second symbol sequences on a symbol-by-symbol basis; and
selecting an equalizer setting for normal non-calibration operation of a continuous-time equalizer of said receiver based on said offset-data error-rate measurements.

2. A calibration process as recited in claim 1 wherein said offset-data error-rate measurements are offset-data error counts of offset-data errors detected over a fixed duration, and wherein said measuring includes sequentially obtaining offset-data error counts for progressively lower-compensating equalization settings until an offset-data error count is obtained that is greater than or equal to a previously obtained offset-data error count, said selecting involving selecting an equalizer setting associated with said previously obtained offset-data error count.

3. A calibration process as recited in claim 2 wherein said first data-symbol dequence is a high-offset data-symbol sequence and said second data-system sequence is a low-offset data-symbol sequence obtained using references that differ by a fixed offset from each other.

4. A calibration process as recited in claim 3 wherein each of said offset-data error counts corresponds to a number of symbol-decision inconsistencies between said high-offset data-symbol sequence and said low-offset data-symbol sequence.

5. A calibration process as recited in claim 4 wherein said inconsistencies are detected by XORing said high-offset data-symbol sequence and said low-offset data-symbol sequence.

6. A calibration process as recited in claim 2 wherein said sequentially obtaining offset-data error counts includes obtaining a offset-data error count for a first equalization setting that is higher than required to compensate effects of said channel.

7. A calibration process as recited in claim 6 further comprising maintaining a transmitter at a lower-than-optimal pre-compensation level during said measuring.

8. A system including computer-readable media encoded with code to, when executed by a processor, implement the process of claim 1.

9. A receiver comprising:
- a continuous-time equalizer (CTE) to equalize a received data input signal to yield an equalized data input signal, said CTE having selectable equalization settings;
- a sampling module configured to generate plural concurrent data-symbol sequences by sampling instances of said equalized data input signal by operating respective samplers in-phase with respect to each other using respective references offset with respect to each other;
- an offset-data error-rate meter to provide offset-data error-rate measurements by comparing said data-symbol sequences on a symbol-by-symbol basis; and
- a calibration controller to select among said equalization settings based on said offset-data error-rate measurements.

10. A receiver as recited in claim 9 wherein:
said sampling module includes samplers that are operated in-phase with respect to each other to generate a receiver-output data-symbol sequence, a high-offset data-symbol sequence, and a low-offset data-symbol sequence; and
said offset-data error-rate meter measures offset-data error-rates by counting offset-data errors detected by comparing said high-offset data-symbol sequence and said low-offset data-symbol sequence on a symbol-by-symbol basis.

11. A receiver as recited in claim 10 wherein said comparing includes XORing said high-offset data-symbol sequence and said low-offset data-symbol sequence.

12. A receiver as recited in claim 9 wherein said offset-data error-rate meter measures offset-data error rates by counting offset-data errors over a predetermined duration to yield offset-data error counts.

13. A receiver as recited in claim 12 wherein said equalization settings include a relatively high-compensation setting and a relatively low-compensation setting, said calibration controller being configured to sweep from said relatively high-compensation setting toward said relatively low-compensation setting until an offset-data error count is obtained that equals or exceeds a preceding offset-data error count obtained during the sweep.

14. A receiver as recited in claim 12 wherein said duration is determined based on an amount of inter-symbol interference information.

15. A receiver as recited in claim 9 further comprising clock-data recovery logic to cause said samplers to sample more towards a center than towards an edge of a data symbol period.

* * * * *

UNITED STATES PATENT AND TRADEMARK OFFICE
CERTIFICATE OF CORRECTION

PATENT NO. : 8,798,126 B2
APPLICATION NO. : 13/285526
DATED : August 5, 2014
INVENTOR(S) : Dacheng Zhou et al.

It is certified that error appears in the above-identified patent and that said Letters Patent is hereby corrected as shown below:

In the Specification:

In column 3, line 66, delete "DCRC" and insert -- (DCRC) --, therefor.

In the Claims:

In column 6, line 50, in Claim 3, delete "dequence" and insert -- sequence --, therefor.

Signed and Sealed this
Eighteenth Day of November, 2014

Michelle K. Lee
*Deputy Director of the United States Patent and Trademark Office*